United States Patent
Murakami et al.

(10) Patent No.: US 9,584,496 B2
(45) Date of Patent: *Feb. 28, 2017

(54) SYSTEMS AND METHODS FOR SECURELY MONITORING AN INDIVIDUAL

(75) Inventors: Rick V. Murakami, North Ogden, UT (US); David Miller, Morgan, UT (US); Matthew W. Pettit, Mountain Green, UT (US); Larry V. Lunt, Holladay, UT (US)

(73) Assignee: CONVERGENCE BIOMETRICS, LLC, Morgan, UT (US)

( * ) Notice: Subject to any disclaimer, the term of this patent is extended or adjusted under 35 U.S.C. 154(b) by 1105 days.

This patent is subject to a terminal disclaimer.

(21) Appl. No.: 13/497,123

(22) Filed: Sep. 5, 2012

(65) Prior Publication Data

US 2013/0057385 A1 Mar. 7, 2013

Related U.S. Application Data

(63) Continuation of application No. 12/563,933, filed on Sep. 21, 2009, now Pat. No. 8,049,597.
(Continued)

(51) Int. Cl.
*G05B 19/00* (2006.01)
*G06F 7/00* (2006.01)
(Continued)

(52) U.S. Cl.
CPC .............. *H04L 63/08* (2013.01); *G06F 21/32* (2013.01); *G06F 21/34* (2013.01);
(Continued)

(58) Field of Classification Search
CPC .................. G05B 19/00; G06F 7/00
(Continued)

(56) References Cited

U.S. PATENT DOCUMENTS 4,109,237 A 8/1978 Hill
4,537,484 A 8/1985 Fowler et al.
(Continued)

FOREIGN PATENT DOCUMENTS

EP 1 916 615 A1 4/2008
JP Sho 60-126787 7/1985
(Continued)

OTHER PUBLICATIONS

Biel, Lena et al., "ECG Analysis: A New Approach in Human Identification," IMTC/99. Proc. of the 16th IEEE Instrumentation and Measurement Technology Conf., vol. 1, 1999, pp. 557-561.
(Continued)

*Primary Examiner* — Nam V Nguyen
(74) *Attorney, Agent, or Firm* — Lowenstein Sandler LLP

(57) ABSTRACT

A biometric sensor may be coupled to a portable communications device, such as a cellular telephone. The biometric sensor may be configured to acquire one or more measurements of biological characteristics of an individual. One or more of the measurements may relate to internal, sub-epidermal characteristics of the individual, such as non-volitional processes occurring within the individual, sub-epidermal structures within the individual, or the like. A biometric marker may be derived from one or more of the measurements. The portable communications device may be activated responsive to deriving the biometric marker. The activation may include transmitting the measurements and/or biometric markers derived therefrom to a receiver using the portable communications device.

29 Claims, 6 Drawing Sheets

Related U.S. Application Data

(60) Provisional application No. PCT/US2010/048696, filed on Sep. 14, 2010.

(51) Int. Cl.
| | |
|---|---|
| *G08B 29/00* | (2006.01) |
| *H04L 9/00* | (2006.01) |
| *H04L 29/06* | (2006.01) |
| *G06F 21/32* | (2013.01) |
| *G06F 21/34* | (2013.01) |
| *G06F 21/62* | (2013.01) |
| *G06K 9/00* | (2006.01) |
| *H04M 1/67* | (2006.01) |

(52) U.S. Cl.
CPC ..... *G06F 21/6245* (2013.01); *G06K 9/00885* (2013.01); *G06K 9/00979* (2013.01); *H04L 63/166* (2013.01); *H04M 1/67* (2013.01)

(58) Field of Classification Search
USPC ....... 340/5.82, 5.52, 5.53, 5.1, 6.1; 382/124, 382/115; 235/380, 492, 379, 381; 455/411; 600/310, 316, 317, 322; 705/51, 3, 2, 301
See application file for complete search history.

(56) References Cited

U.S. PATENT DOCUMENTS

| | | | |
|---|---|---|---|
| 4,544,267 A | 10/1985 | Schiller | |
| 4,582,985 A | 4/1986 | Lofberg | |
| 4,614,861 A | 9/1986 | Pavlov et al. | |
| 4,699,149 A | 10/1987 | Rice | |
| 4,728,186 A | 3/1988 | Eguchi et al. | |
| 4,784,484 A | 11/1988 | Jensen | |
| 4,846,190 A | 7/1989 | John | |
| 5,036,279 A | 7/1991 | Jonsen | |
| 5,073,950 A | 12/1991 | Colbert et al. | |
| 5,077,803 A | 12/1991 | Kato et al. | |
| 5,088,817 A | 2/1992 | Igaki et al. | |
| 5,103,486 A | 4/1992 | Grippi | |
| 5,152,288 A | 10/1992 | Hoenig et al. | |
| 5,172,698 A | 12/1992 | Stanko | |
| 5,180,901 A | 1/1993 | Hiramatsu | |
| 5,230,025 A | 7/1993 | Fishbine et al. | |
| 5,311,867 A | 5/1994 | Kynor | |
| 5,325,862 A | 7/1994 | Lewis et al. | |
| 5,335,288 A | 8/1994 | Faulkner | |
| 5,456,256 A | 10/1995 | Schneider et al. | |
| 5,526,808 A | 6/1996 | Kaminsky | |
| 5,586,171 A | 12/1996 | McAllister et al. | |
| 5,623,552 A | 4/1997 | Lane | |
| 5,632,272 A | 5/1997 | Diab et al. | |
| 5,666,400 A | 9/1997 | McAllister et al. | |
| 5,704,352 A | 1/1998 | Tremblay et al. | |
| 5,719,950 A | 2/1998 | Osten et al. | |
| 5,737,439 A | 4/1998 | Lapsley et al. | |
| 5,771,894 A | 6/1998 | Richards et al. | |
| 5,774,571 A | 6/1998 | Marshall | |
| 5,789,733 A | 8/1998 | Jachimowicz et al. | |
| 5,793,881 A | 8/1998 | Stiver et al. | |
| 5,872,834 A | 2/1999 | Teitelbaum | |
| 5,935,062 A | 8/1999 | Messerschmidt et al. | |
| 5,982,914 A | 11/1999 | Lee et al. | |
| 5,987,232 A | 11/1999 | Tabuki | |
| 6,088,585 A | 7/2000 | Schmitt et al. | |
| 6,104,913 A | 8/2000 | McAllister | |
| 6,104,922 A | 8/2000 | Baumann | |
| 6,148,094 A | 11/2000 | Kinsella | |
| 6,164,403 A | 12/2000 | Wuidart | |
| 6,171,112 B1 | 1/2001 | Clark et al. | |
| 6,182,892 B1 | 2/2001 | Angelo et al. | |
| 6,193,153 B1 | 2/2001 | Lambert | |
| 6,202,151 B1 | 3/2001 | Musgrave et al. | |
| 6,208,264 B1 | 3/2001 | Bradney et al. | |
| 6,219,639 B1 | 4/2001 | Bakis et al. | |
| 6,224,548 B1 | 5/2001 | Gopinathan et al. | |
| 6,225,890 B1 | 5/2001 | Murphy | |
| 6,232,874 B1 | 5/2001 | Murphy | |
| 6,266,566 B1 | 7/2001 | Nichols et al. | |
| 6,269,348 B1 | 7/2001 | Pare, Jr. et al. | |
| 6,275,806 B1 | 8/2001 | Pertrushin | |
| 6,289,453 B1 | 9/2001 | Walker et al. | |
| 6,483,929 B1 | 11/2002 | Murakami et al. | |
| 6,496,595 B1 | 12/2002 | Puchek et al. | |
| 6,532,298 B1 | 3/2003 | Cambier et al. | |
| 6,539,380 B1 | 3/2003 | Moran | |
| 6,628,809 B1 | 9/2003 | Rowe et al. | |
| 6,681,029 B1 | 1/2004 | Rhoads | |
| 6,695,207 B1 | 2/2004 | Norris, Jr. | |
| 6,816,605 B2 | 11/2004 | Rowe et al. | |
| 6,819,219 B1 | 11/2004 | Bolle et al. | |
| 6,898,299 B1 | 5/2005 | Brooks | |
| 6,920,231 B1 | 7/2005 | Griffin | |
| 7,113,616 B2 | 9/2006 | Ito et al. | |
| 7,133,792 B2 | 11/2006 | Murakami et al. | |
| 7,188,362 B2 | 3/2007 | Brandys | |
| 7,214,953 B2 | 5/2007 | Setlak et al. | |
| 7,358,514 B2 | 4/2008 | Setlak et al. | |
| 7,441,123 B2 | 10/2008 | Grant et al. | |
| 7,676,426 B2* | 3/2010 | Lawrence | G06Q 20/10 705/38 |
| 8,049,597 B1* | 11/2011 | Murakami et al. | 340/5.82 |
| 8,905,927 B2* | 12/2014 | Cheung Hyen et al. | 600/301 |
| 2001/0033220 A1 | 10/2001 | Stone et al. | |
| 2002/0138768 A1 | 9/2002 | Murakami et al. | |
| 2002/0174347 A1 | 11/2002 | Ting | |
| 2002/0191817 A1 | 12/2002 | Sato et al. | |
| 2003/0128867 A1 | 7/2003 | Bennett | |
| 2003/0233557 A1 | 12/2003 | Zimmerman | |
| 2004/0187037 A1 | 9/2004 | Checco | |
| 2004/0240711 A1 | 12/2004 | Hamza et al. | |
| 2005/0122209 A1 | 6/2005 | Black | |
| 2005/0223234 A1 | 10/2005 | McOwan et al. | |
| 2005/0267752 A1 | 12/2005 | Navratil et al. | |
| 2006/0067573 A1 | 3/2006 | Parr et al. | |
| 2006/0093190 A1 | 5/2006 | Cheng et al. | |
| 2006/0116970 A1 | 6/2006 | Scherzer et al. | |
| 2006/0171571 A1 | 8/2006 | Chan et al. | |
| 2006/0210119 A1 | 9/2006 | Willis et al. | |
| 2006/0253610 A1 | 11/2006 | Yamada et al. | |
| 2006/0270916 A1 | 11/2006 | Skwarek et al. | |
| 2006/0293892 A1 | 12/2006 | Pathuel | |
| 2007/0016777 A1 | 1/2007 | Henderson et al. | |
| 2007/0063816 A1 | 3/2007 | Murakami et al. | |
| 2007/0086630 A1 | 4/2007 | Setlak et al. | |
| 2007/0129941 A1 | 6/2007 | Tavares | |
| 2007/0192591 A1 | 8/2007 | Yumoto et al. | |
| 2008/0242231 A1 | 10/2008 | Gray | |
| 2008/0260211 A1 | 10/2008 | Bennett et al. | |
| 2009/0112769 A1* | 4/2009 | Dicks et al. | 705/51 |
| 2012/0203465 A1* | 8/2012 | Callewaert et al. | 702/19 |

FOREIGN PATENT DOCUMENTS

| | | |
|---|---|---|
| JP | Sho 61-175865 | 8/1986 |
| JP | Sho 63-20583 | 1/1988 |
| JP | Sho 63-53099 | 3/1988 |
| JP | Sho 63-120385 | 5/1988 |
| JP | Sho 63-313288 | 12/1988 |
| JP | Hei 1-175362 | 12/1989 |
| JP | Hei 4-24889 | 1/1992 |
| JP | 2000-181871 | 6/2000 |
| KR | 10-2008-0044223 A | 5/2008 |
| KR | 10-2006-0076642 A | 7/2008 |
| KR | 10-2008-0073988 A | 8/2008 |
| WO | WO88/04153 | 6/1988 |
| WO | WO98/37519 | 8/1998 |

(56) References Cited

OTHER PUBLICATIONS

Kachigan, Sam Kash, "Multivariate Statistical Analysis," Radius Press, 1991, 1986, 1982, 4 pgs.

Hayes, Matthew J., et al., "Quantitative Evaluation of Photoplethysmographic Artefact Reduction for Pulse Oximetry," Optical Engineering Group, Department of Electrical and Electronic Engineering, Loughborough University, Loughborough, Leicestershire, LE11 3TU, UK, SPIE vol. 3570,Sep. 1, 1998, 14 pgs.

Scholz, Udo, J., "Multivariate Spectral Analysis of the Beat-to-Beat Sampled Cortical NIRS-Signals and the Heart Rate Variability," Department of Neurology, Charite, Humboldt University, Berlin, Germany, SPIE vol. 3566, Sep. 1998, 6 pgs.

Hoeksel, S.A., et al., "Detection of Dicrotic Notch in Arterial Pressure Signals," Department of Anesthesiology, Cardiovascular Research Institute Maastricht, Maastricht University, The Netherlands, www.medscape.com, 1997, 1 pg.

Cysewska-Sobusiak, Anna, "Noninvasive Monitoring of Arterial Blood Oxygenation with Spectrophotometric Technique," Institute of Electronics and Communications, Technical University of Poznan, Piotrowo 3a, PL-60-965 Poznan, Poland, SPIE vol. 1711, 1992, 14 pgs.

Leichter, I., et al., "Effect of Age and Sex on Bone Density, Bone Mineral Content and Cortical Index," Energy Citations Database (ECD)—Energy and Energy-Related Bibliographic Citations, May 1, 1981, 2 pgs.

Smith, SL, "Attribution of Hand Bones to Sex and Population Groups," Journal of Forensic Sciences, vol. 41, Issue 3, www.astm.org/cgi-bin/SoftCart.exe/JOURNALS/FORENSIC/PAGES/JFS41396046, May 1996, printed Jan. 14, 2007, 1 pg.

Jain, Anil K., et al., "Multibiometric Systems," Communications of the ACM, Jan. 2004, vol. 47, No. 1, pp. 34-40.

Office Action for U.S. Appl. No. 09/815,885, filed Mar. 23, 2001, mailed from the USPTO on Mar. 17, 2008, 12 pgs.

Office Action for U.S. Appl. No. 10/300,659, filed Nov. 19, 2002, mailed from the USPTO on Dec. 27, 2007, 15 pgs.

Office Action for U.S. Appl. No. 09/758,836, filed Jan. 10, 2001, mailed from the USPTO on Apr. 17, 2007, 12 pgs.

Office Action for U.S. Appl. No. 12/563,941, filed Sep. 21, 2009, mailed from the USPTO on Apr. 13, 2011, 20 pgs.

Office Action for U.S. Appl. No. 10/300,659, filed Nov. 19, 2002, mailed from the USPTO on Jul. 7, 2009, 11 pgs.

Office Action for U.S. Appl. No. 10/300,659, filed Nov. 19, 2002, mailed from the USPTO on Jan. 20, 2010, 14 pgs.

Office Action for U.S. Appl. No. 10/300,659, filed Nov. 19, 2002, mailed from the USPTO on Jul. 6, 2010, 17 pgs.

Office Action for U.S. Appl. No. 12/125,740, filed Nov. 19, 2002, mailed from the USPTO on Jul. 9, 2010, 20 pgs.

Office Action for U.S. Appl. No. 12/563,937, filed Nov. 19, 2002, mailed from the USPTO on Sep. 9, 2010, 21 pgs.

Office Action for U.S. Appl. No. 12/563,937, filed Nov. 19, 2002, mailed from the USPTO on Oct. 28, 2010, 22 pgs.

Office Action for U.S. Appl. No. 09/814,607, filed Mar. 22, 2001, mailed from the USPTO on Dec. 19, 2008, 14 pgs.

Office Action for U.S. Appl. No. 09/758,836, filed Jan. 10, 2001, mailed from the USPTO on Jul. 23, 2008, 16 pgs.

Office Action for U.S. Appl. No. 09/758,836, filed Jan. 10, 2001, mailed from USPTO on Feb. 4, 2009, 15 pgs.

Office Action for U.S. Appl. No. 12/563,937, filed Sep. 21, 2009, mailed from USPTO on May 24, 2011, 20 pgs.

Office Action for U.S. Appl. No. 12/563,933, filed Sep. 21, 2099, mailed from the USPTO on Jun. 14, 2011, 12 pgs.

Office Action for U.S. Appl. No. 12/050,077, filed Mar. 17, 2008, mailed from the USPTO on May 17, 2011, 23 pgs.

International Search Report and Written Opinion for PCT/US2010/048696 with international fling date of Sep. 14, 2010, mailed May 24, 2011, 8 pgs.

International Search Report and Written Opinion for PCT/US2009/31638 with international fling date of Jan. 22, 2009, mailed Mar. 6, 2009, 12 pgs.

* cited by examiner

SYSTEMS AND METHODS FOR SECURELY MONITORING AN INDIVIDUAL

CROSS-REFERENCE TO RELATED APPLICATIONS

This application is a United States National Stage Application of PCT Application No. PCT/US2010/048696 filed Sep. 14, 2010, and entitled, "Systems and Methods for Securely Monitoring an Individual," which is a continuation of U.S. patent application Ser. No. 12/563,933, filed on Sep. 21, 2009, and issued as U.S. Pat. No. 8,049,597, on Nov. 1, 2011, each of which is incorporated by reference.

BACKGROUND OF THE INVENTION

The present invention relates generally to a biometrically activated device. More specifically, the invention relates to a biometrically activated device capable of authenticating or verifying a user's identity based on a unique internal biometric marker, or combination of unique internal biometric markers, of a user, thereby allowing or denying access to and/or control over an electronic component.

Security devices have been around for ages. From drawbridges to locks on doors and furniture, people have attempted to secure their well-being and personal belongings from harms way. As technological advances were made, new means of security were created. Door locks require codes to disengage the lock, car doors are equipped with number pads, vehicle ignition keys include microchips encoded to communicate with the vehicle so as to prevent theft. Financial transactions have also become more secure. Currency is more sophisticated in order to thwart copying, credit cards require authentication signatures, bank account access requires account numbers, and personal identification numbers are issued for everything from calling cards to internet access to stock market trading accounts.

As technology continues to advance at a rapid rate, the search for more sophisticated, unbreakable, security measures continues. The key to an effective security system is the identification of the individual or entity attempting to access that which is protected by the security system, be it a home, financial information, or communications. Mechanical keys can be copied, personal identification numbers stolen, and credit cards misused without much trouble. The level of theft is evident from the billions of dollars in fraudulent financial transactions taking place each year, stolen vehicles, and home break-ins. Of particular concern is the relatively new crime wherein a persons 'identity' is stolen. In this day and age, a person's identity is closely tied to a bank account number, a phone number, an identification number, a social security number, or other such information which is easily stolen and then used to access the owner's information or property. When such a crime occurs, the victim suffers financial decimation, credit destruction, and countless hours of agony in attempting to 'rebuild' their 'identity'.

One form of fraud involves electronic transaction fraud, such as fraudulent credit and debit card transactions. Typically, a magnetic strip on one surface of such cards carries an electronic form of a series of numbers, which identifies the account to be credited or debited. To execute a financial transaction using such a card, all that is needed is the series of numbers and authentication that the card is being used by the authorized user. Such authorization typically consists of photo identification or verification of a signature if the card is being used in a person to person transaction. Transactions conducted through other media, such as the telephone or over the internet, are often authenticated using some other form of identification, such as the billing address or phone number of the authorized user of the card. Because this information is often readily available to the public, such authentication processes are not very secure.

In the electronic transaction market, efficient identification of people is not only very critical, but very difficult, due to the rapid nature of monetary exchanges. In cases of pure electronic transactions, there is no physical document that acts as a transaction mechanism. In addition to this, most electronic transactions are performed from a location that is remote relative to the funds involved. The identification of the holder of the transaction device, such as a credit card, is the responsibility of the merchant or third party willing to accept an electronic transaction. Accurate identification and authentication of the validity of the transaction device is not always possible and, even when obtained, is not always accurate.

The advent of the internet has added an entirely new dimension to the problems associated with electronic transaction fraud. The internet provides a medium wherein the user of a transaction device and a third party willing to accept an electronic transfer of funds never have any actual contact. This creates further authentication problems for the third party because the transfer device is not physically present, the identification of the user is not visually apparent, and a telephone number cannot be authenticated. As a result of the increased use of e-commerce, and ensuing authentication difficulties therewith, the incidence of electronic transaction fraud has been on the increase. In the immediate future, the opportunity and incidence of fraud will increase correspondingly unless sufficient security measures capable of positively identifying an individual are implemented.

The market has responded to the difficulties of authenticating electronic transfer devices, and positively identifying individuals, by searching for a viable biometric solution to the problems. Biometric technology generally involves the electronic identification of an individual using physiological traits which are unique to that same individual. Fingerprints are an excellent example of a biometric marker used for years to provide the unique identification of individuals. Because a fingerprint is unique to an individual, the identity of that individual may be determined through an analysis of the fingerprint. Thus, the identity of the individual, determined from a fingerprint, may act as a 'key' to unlock data or allow access through a door.

In particular, fingerprints have been used to secure some transactions and have been proposed for use in other areas. Many banks require that a finger print or thumb print of a person cashing a check be placed on the check. This allows the bank to later verify or identify anyone passing fraudulent checks. Along a similar line, it has been proposed that Automated Teller Machines (ATM) be equipped with fingerprint pads to provide further security to ATM transactions. An ATM having a fingerprint pad would require the user to validate their ATM card byway of their fingerprint. This could be accomplished by inserting the ATM card into the machine, entering a Personal Identification Number (PIN), and then requiring the user to place their thumb or finger on the pad so that the ATM machine can analyze the fingerprint and confirm the identity of the individual using the card. Such a system would necessarily rely on a database built into the ATM or connected to the ATM, to provide a list of users and corresponding fingerprint information. The fingerprint of the user could be compared to the data in the database to confirm that the ATM card being used did in fact belong to the person associated with the fingerprint placed on the fingerprint pad of the ATM.

Other known biometric markers include palm prints, iris scans, proportional comparison of physical traits, and voice recognition. For the most part, these biometric markers, like the fingerprint, are external physiological traits or characteristics. Information unique to an individual is gathered through various scanning processes which scan a external biometric marker of an individual. A number of United States Patents discuss biometric devices which may be used to help identify a person. Examples of external biometric devices include those described in U.S. Pat. Nos. 4,537,484; 4,544,267; 4,699,149; 4,728,186; 4,784,484; 5,073,950; 5,077,803; 5,088,817; 5,103,486; 5,230,025; and 5,335,288 Internal biometric data has also been used to verify that a subject is alive. Such verifications have been accomplished by passively verifying physiological process, such as registering electrical impulses (EKG), or actively verifying physiological norms by introducing and capturing a modified signal, such as introducing light energy to determine blood gas content (pulse oximeter). Examples of such biometric readings are describe in U.S. Pat. Nos. 5,719,950; and 5,737,439. The disclosures of each of the patents listed above are hereby incorporated by reference.

One of the downfalls of using the devices which are currently available in the market for analyzing external biometric markers is the cost of installing the necessary scanning devices to provide the required security. For each different trait to be tested, whether it is a fingerprint, retinal scan, voice print, or the like, a different piece of expensive scanning equipment is necessary. Installation of such equipment into machines such as ATMs is economically impractical because each ATM would require the installation of the expensive scanning device.

Another downfall of the biometric scanning devices currently available is their size. The necessary scanning equipment is bulky, making it impractical to attach the scanning equipment to portable devices such as cell phones, credit cards, personal data assistants, portable computers, and the like.

Further, incompatibility across multiple systems renders the deployment of standard biometric identification on a wide scale very challenging, if not impossible. In addition, large databases storing the vast amount of data necessary to authenticate biometrically activated transactions or authentications result in further costs which have heretofore made biometric identification a poor candidate as a security device for low level or mass produced systems.

The downfalls of the current biometrically activated security systems can be overcome through the use of portable biometrically activated devices which only store the biometric profile of a single individual or a small group of individuals. The use of unique internal biometric markers, rather than external biometric markers, provides advantages which overcome the downfalls of the present biometric scanning devices used for security and the identification of individuals.

BRIEF SUMMARY OF THE INVENTION

The present invention provides an apparatus and process which utilizes unique internal human biometric markers to verify the identity of the user of the biometrically activated device or provide access or control over an electronic component. More specifically, the biometrically activated device of the present invention allows non-invasive access to a unique internal biometric marker, or some combination of unique internal biometric markers, and compares the scanned biometric marker to a biometric marker or profile stored within the biometrically activated device, thereby attempting to verify the identity of an individual using the biometrically activated device. A biometric marker, for the purposes of this invention, is a human internal physiological characteristic, or biologically active feature, which, preferably, is unique to each individual member of the human race. The biometric markers of the present invention are not merely measurements of superficial anatomical structure, but instead utilize or alternatively include measurements of physiological traits of the various systems of the human body and/or are histological traits associated with tissues of the human body. In addition, a unique biometric marker is one which does not significantly vary over time such that the biometric marker is always unique to the individual. The device scans a selected body part or biological feature of the user, taking an internal biometric measurement or recording internal biometric data from the same.

A biometric profile of the subject attempting to activate the biometrically activated device may be electronically constructed from the data or measurement obtained. The profile, measurement, or data is then analyzed and compared to a stored biometric profile, or profiles, to determine whether or not the user is authorized to use the device or access the information that the biometrically activated device is protecting. As with a conventional door key, the authorization or verification of a valid user triggers the biometrically activated device to unlock certain information or activate or provide access to that which the device is protecting.

In its simplest form, the biometrically activated device comprises a biometric sensor and a memory module. The biometric sensor obtains the requisite internal biometric measurements or data from a user and compares the measurements or data to a biometric profile stored within the memory module. If the biometric profile stored in the memory module matches the measurements or data obtained from the user of the biometrically activated device, the biometrically activated device provides access to the data stored within a memory module, triggers the disengagement of a locking mechanism, or performs a function on a mechanical device.

The biometrically activated device transmits or emits energy towards a human user. A portion of the emitted energy is reflected back to the biometrically activated device where it is received. The received signal is then transformed into an electric signal which represents a unique biometric profile of the user. The profile may then be compared to a biometric profile stored in the memory module of the biometrically activated device. If the user's profile matches a profile stored within the memory module, the biometrically activated device is activated or is permitted to function in the manner in which it is programmed to function.

The biometrically activated device can provide a means to control access, secure information, initiate electrical components, or provide a general security system. The internal biometric marker or combination of markers scanned is unique to each individual and, thus, difficult or impossible to otherwise reproduce. Likewise, the biometric profile stored within a biometrically activated device is unique to the device. Without knowledge of the specific internal biometric marker or markers scanned by the biometrically activated device, a biometric profile cannot be reverse engineered or reconstructed so as to activate the biometrically activated device. In other words, the biometrically activated device may scan a user for numerous unique biometric markers, however, without knowing which marker is compared within the memory module, reverse engineering is virtually impossible. In this fashion, the biometrically activated device provides superior security features over present day security systems.

The biometrically activated device of the present invention focuses on internal biometric markers unique to a specific individual, instead of external biometric markers, such as fingerprints, or non-unique biometric markers, such as blood pulse readings, and overcomes the problems associated with traditional security systems to provide a more viable alternative to the external biometric sensors currently available.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DESCRIPTION OF THE ILLUSTRATED EMBODIMENTS

Figure 1:
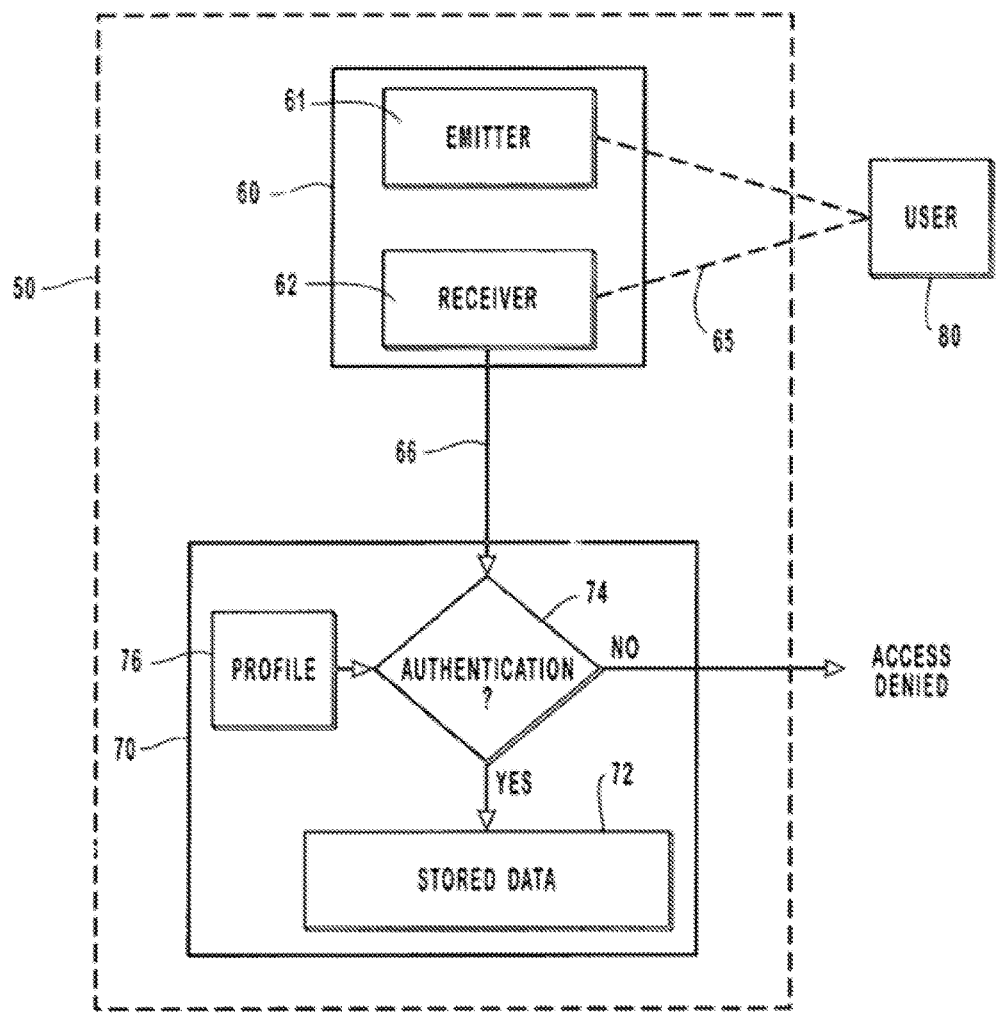
FIG. 1 is a schematic of a preferred embodiment of a biometrically activated device.

Generally, the biometrically activated device of the present invention comprises a sensor for sensing or determining certain internal biometric markers of a user in communication with a memory module for storing biometric data or biometric profiles of a user or users corresponding to the internal biometric markers obtained by the sensor. When a user attempts to activate the biometrically activated device, the biometric sensor creates a biometric profile of the user and compares that profile with the stored biometric profile of an authorized user. If the user's profile does not match the profile of an authorized user, the data or information stored within the biometrically activated device is unretrievable. However, if the user's profile matches that of an authorized user, the biometrically activated device becomes activated for a set duration of time, thereby providing access to the data or information stored within the biometrically activated device or allowing the user to operate an apparatus which the biometrically activated device protects.

The biometric sensor is configured to determine specific unique internal biometric markers of a user. In a preferred embodiment of the invention, the sensor includes an emitter and a receiver. The emitter emits light or another form of energy which is partially absorbed and partially reflected by a portion of flesh of a user. Such light or energy may include, but is not limited to, ultrasonic energy, infra red light, near infra red light, ultra violet light, specific wavelength-visible or nonvisible light, white light, or electrical signals. The receiver collects those portions of light or energy that are reflected from the user. Based upon the light or energy reflected, data relating to internal biometric markers may be determined and a biometric profile of the user may be constructed. Some of the internal biometric markers which may be measured or determined from the biometric sensor include, but are not limited to, bone density, electromagnetic waves, cardiac rhythms, diacrotic notch readings, blood oxygen levels, capillary density, glucose levels, hematocrit levels, or sub-dermal layer analysis. Other biometric markers, such as bio-electric signals, resistance, impedance, capacitance, or other detectable electrical signals emanating from the body may also be detected by the sensor and used or combined with the feedback to the receiver to create a biometric profile of the user.

The biometric sensor may also include an activation device for activating the biometric sensor so that the biometric sensor is not always activated. Examples of the biometric sensor portion of the biometrically activated device of the present invention are more fully explained in the examples described below.

The memory module of the biometrically activated device is capable of receiving and storing data. The memory module is also capable of performing functions on the stored or received data to effectuate the creation of a biometric profile for a user. A biometric profile is based upon an internal biometric marker or markers of the user. Energy signals obtained from the biometric sensor may be converted into electrical signals which in turn may be converted to a biometric profile based upon a mathematical algorithm or transformation. The memory module may also store the commands or programming which will allow access to the apparatus being protected, or stored data such as phone numbers, account codes, or other information which a user wishes to keep private. Examples of the memory module of the present invention are further explained below.

Because the biometrically activated device is based upon a user's profile, the biometrically activated device is at least capable of accepting an initial biometric profile corresponding to the desired authorized user. The profile may be determined from the first use of the biometrically activated device or, alternatively, programmed before the first use in accordance with predefined biometric profiles.

FIG. 1 illustrates a schematic of the preferred embodiment of the biometrically activated device of the present invention. The device 50 includes a biometric sensor 60 and a memory module 70. The biometrically activated device is activated by the contact of a user 80 with the biometric sensor 60 of the device 50. Preferably, the user 80 will activate the device 50 by placing a finger on the biometric sensor 60 for a period of time sufficient for the biometric sensor 60 to perform a scan of at least one unique internal biometric marker of the user 80. It is also understood that the device 50 may be remotely activated or may be maintained in an activated state.

Activation of the device 50 triggers the emission of energy 65 from an emission device 61. The energy 65 is directed towards a user 80 where it is both absorbed and reflected. The portion of energy 65 reflected back at the device 50 is measured by a receiving device 62. The receiving device 62 interprets the amount of energy 65 received and converts the energy into an electrical signal 66 which is communicated to the memory module 70 of the device 50. In alternate embodiments, the energy received by the receiving device 62 is converted to an electrical signal 66 by a translator (not shown).

The memory module 70 receives the electrical signal 66 and begins an authentication process of comparing an internal biometric marker, or markers, of the user 80 with the biometric marker, or markers, of the authorized users stored in the memory module 70. The characteristics of the electrical signal 66 represent the internal biometric marker, or markers, which the biometric sensor 60 obtains from the user 80. The memory module 70 compares the electrical signal 66 to a known biometric profile 76 stored within the memory module 70. If the electrical signal 66 is identical to the known biometric profile 76, the biometrically activated device has authenticated the user 80 and allows access to the data 72 stored within the memory module 70. If the electrical signal 66, is not authenticated, the biometric device 50 denies access to the data 72 stored within the memory module 70. Preferably, when access to the data 72 is denied, the biometric device 50 automatically turns off.

Although the electrical signal 66 may be directly compared to the known biometric profile 76, the electrical signal 66 may also be transformed within the memory module 70 prior to comparison with the known biometric profile 76. The electrical signal 66 may be transformed into a mathematical representation or value based on algorithms programmed into the memory module 70. The algorithms typically represent the necessary transforms needed to interpret the internal biometric marker represented by the electrical signal 66. The mathematical representation or value, which represents the biometric profile of the user 80, is compared to a known biometric profile 76 stored within the memory module 70. If the mathematical representation or value is authenticated, access to the data 72 stored in the memory module is allowed.

Once accessed, the data 72 stored within the biometric device 50 may be displayed in some manner or used to perform an act on another device. For example, the data 72 may be displayed on an output device. Likewise, the data 72 may trigger the execution of a program within the memory module 70 such that the memory module 70 causes the actuation of a device, such as a door lock, in communication with the memory module. Further examples are described herein.

Figure 2:
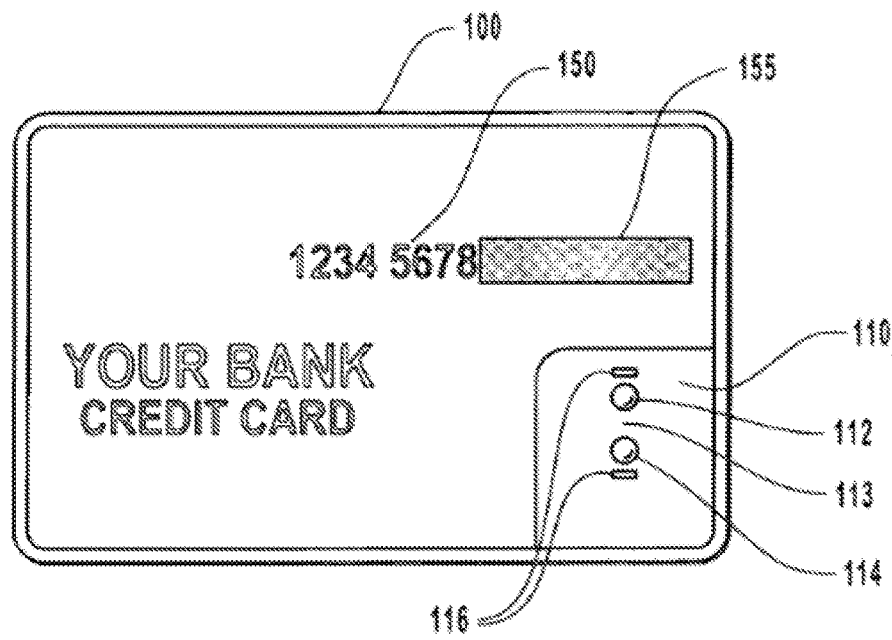
FIG. 2 is a plan view of one embodiment of the biometric device of the present invention.

FIG. 2 illustrates another preferred embodiment of a biometrically activated device: a credit card. A biometrically activated device is an integral portion of a biometric device 100, which in this case has the same shape, size and dimensions as a typical credit card. It is understood, however, that the shape, size, and dimensions of the credit card are not limiting to the invention.

As illustrated, the biometric device 100 includes a biometric sensor having a light emitter 112 and a light acceptor 114. The biometric sensor 110 may additionally include an activation device 116 as shown in FIG. 2. Activation of the biometric sensor 110 triggers the light emitter 112 to emit a light 113. An example of a suitable light emitter 112 is a light emitting diode (LED). Various types of LED's or alternative light sources may be substituted as the light emitter 112 depending upon the desired wavelength and characteristics of light 113 emanating therefrom. The light acceptor 114 can be any device capable of absorbing reflected light 113.

In normal use, an individual wishing to use the biometric device 100 places a body part, such as a thumb or finger, over the biometric sensor 110 such that light 113 emitted from light emitter 112 is directed toward the body part and is reflected back towards the light acceptor 114. Typically, the biometric sensor 110 will include an activation switch 116 which activates the biometric sensor 110 when a body part is placed over the biometric sensor 110, and causes light 113 to be emitted from the light emitter 112 for a fixed duration of time. Light 113 is partially absorbed and partially reflected by the body part covering the biometric sensor 110. Reflected light 113 is monitored by the light acceptor 114.

A preferred embodiment of the invention utilizes an infra red LED, which emits sufficient infra red light to penetrate the epidermal layer of skin of a user. A portion of the infra red light is reflected back to the light acceptor 114 while the remainder of the light is absorbed or lost. Based upon the amount of light reflected back to the light acceptor 114 over a period of time, a biometric profile may be established. The portion of the light signal received by the light acceptor 114 is compared to biometric data or a biometric profile stored within the biometric device 100. If the light signal is identical to the biometric profile stored within the biometric device 100, the biometric device is activated. Where the light signal does not correspond to the stored biometric data or profile, the biometric device is not activated and the biometric sensor 110 is temporarily turned off.

Figure 3:
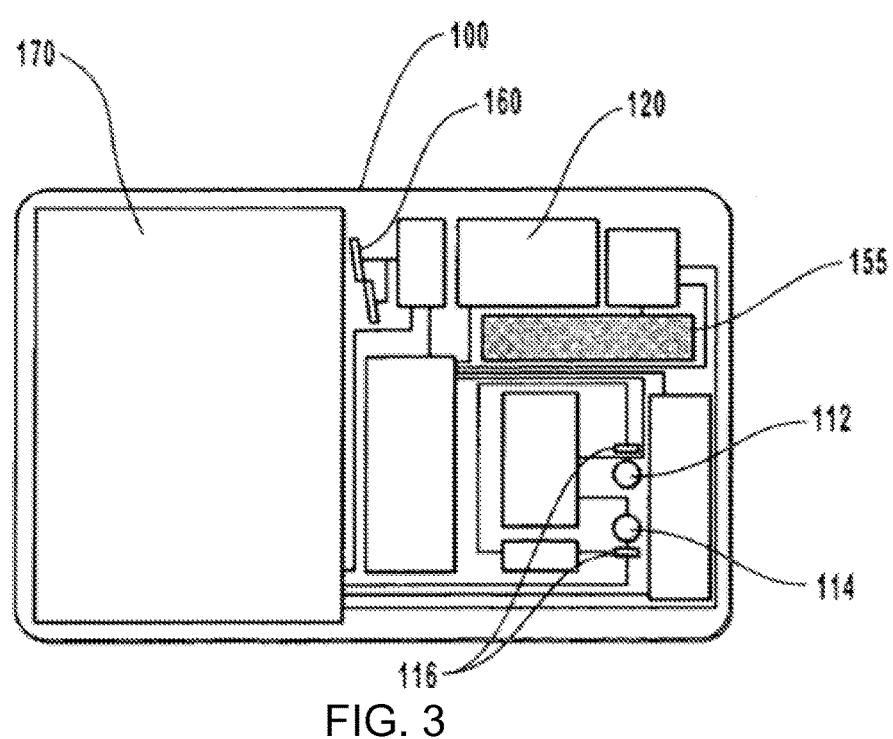
FIG. 3 is a cut-away plan view of the biometric device of FIG. 2.

Activation of the biometric device 100 requires proper identification of the user of the biometric device 100. FIG. 3 depicts a cut-away plan view of the biometric device 100 exposing a memory module 120 in communication with the light acceptor 114 of the biometric sensor 110. The biometric profile of the authorized user is stored within the memory module 120. Other data, such as account codes, names, addresses, pass codes, or graphics, may also be stored within the memory module 120. Once a biometric profile of the user is constructed by the biometric sensor 110, the user's biometric profile is compared to the biometric profile stored within memory module 120. If the user's biometric profile matches that of the biometric profile of the authorized user stored in the memory module 120, the memory module allows access to at least a portion of the additional data or information stored within the memory module 120.

The biometric sensor 110 may also include a translator (not shown) which interprets the level of light or energy received by the light acceptor 114 and constructs a biometric profile based upon the data received. The translator may also be an integral portion of the light acceptor 114 wherein the amount of accepted light is transformed into an electric signal. The biometric profile is then compared to the biometric data or profile stored within the memory module 120.

Figure 4:
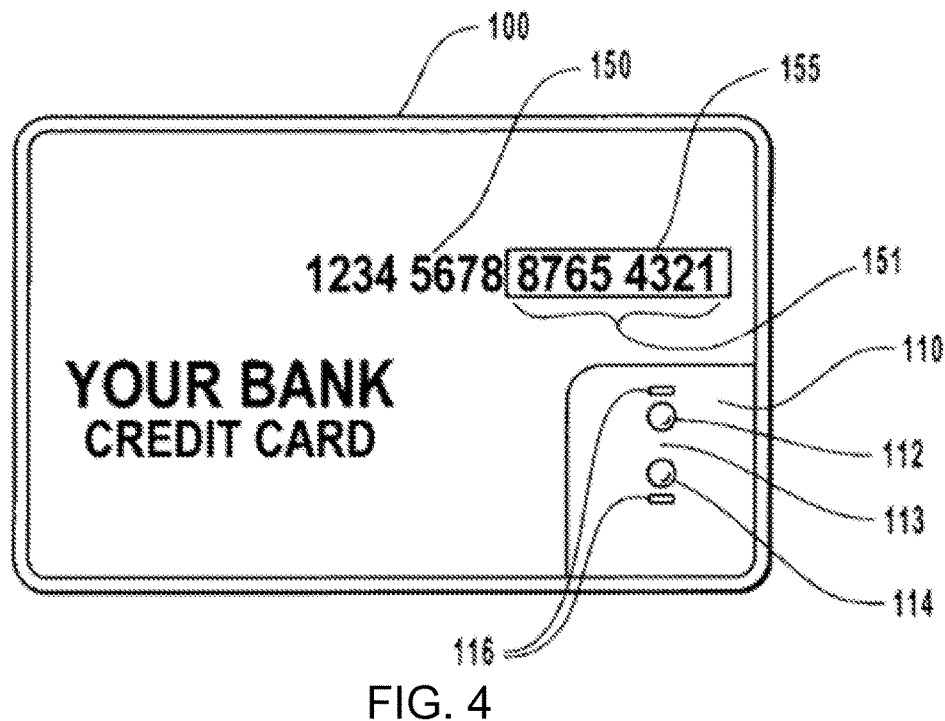
FIG. 4 is a plan view of the biometric device of FIG. 2 in an activated state.
Figure 5:
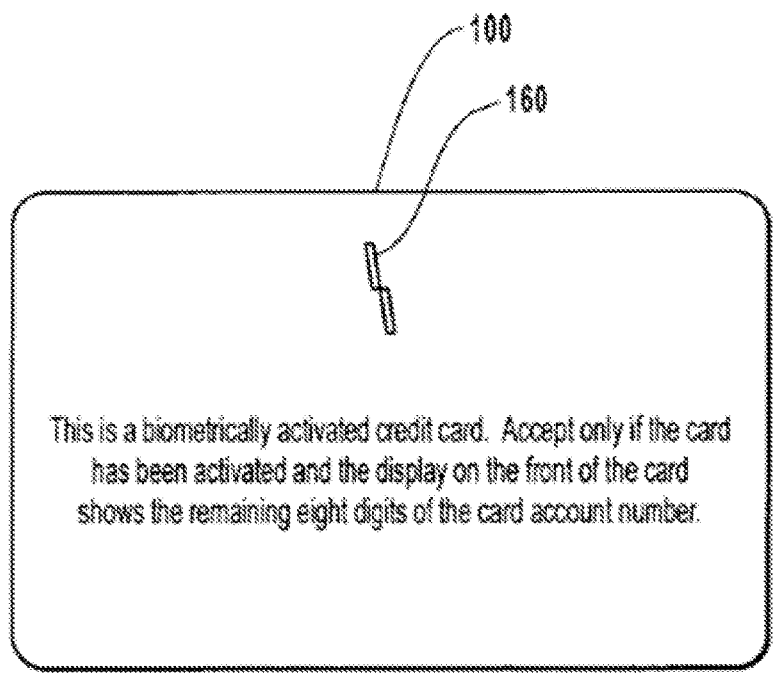
FIG. 5 is a plan view of the back side of the biometric device of FIG. 2.

Upon activation of the biometric device 100 of FIGS. 2 and 3, the memory module 120 releases the information, such as account information, required to perform an electronic transaction. The information stored in the memory module 120 maybe released in a number of ways. As illustrated in FIG. 2, only a portion of the account numbers 150 are embossed on the biometric device 100. In the instant example, a blank liquid crystal display (LCD) 155 is positioned next to the account numbers 150. Upon activation of the biometric device 100, the memory module 120 activates the LCD 155 and communicates the information necessary to display the remaining account numbers 151 on the LCD 155, as illustrated in FIG. 4. Likewise, upon activation of the biometric device 100, the memory module 120 may repeatedly send account information to a magnetic transmitter 160 on the biometric device, as depicted in FIG. 5. The magnetic transmitter 160 shown in FIG. 5 may reside in the same location occupied by the magnetic strip of a credit card, such that the biometric device 100 may be used in the same manner as a credit card upon activation.

Other methods or devices for communicating the data or information stored within the memory module 120 may also be used. For example, the LCD 155 could be replaced with LED's or alternative display devices. Likewise, the magnetic transmitter 160 may be replaced with a digital device providing digital signals for a transaction or a light emitter which would release the data or information stored in the memory module 120 by the emission of visible or non-visible light.

It is intended that the biometric device be self-calibrating. For example, the original biometric data or profiles stored in the memory module 120 may be calibrated through repetitive use. As the biometrically activated device is used, the biometric profiles obtained are averaged such that a specific number of the most recent successful biometric readings, offset by the original biometric profile, are used to create a more complete biometric profile of the authorized user.

As part of the built-in security feature, the biometric device 100 can automatically deactivate. For example, the memory module 120 may be programmed such that, once the user is authenticated and the biometric device is activated, the memory module 120 will display the account numbers 150 on an LCD 155 and/or repeatedly send account information to a magnetic transmitter 160 for a fixed duration of time. Thus, access to the information stored within the memory module 120 may be limited to a specific period of time needed to carry out an electronic transaction. This feature advantageously prevents the unnecessary display of account numbers 150 and electronic copying of information permanently stored in magnetic strips of current credit cards. In addition, because the biometric device 100 may only be activated by the authorized user, others are prevented from using the biometric device 100 to perform an invalid transaction.

The biometric device 100 may further include a power source 170 to supply the necessary energy for the operation of the biometric device 100, as depicted in FIG. 3. The power source may be in the form of a battery, a capacitor, a fuel cell, or alternative energy-producing or storage mechanism. Likewise, the power source may be rechargeable. Examples of alternative power sources include photocells, piezo electric generators, static generators, heat absorbers and other power generation mechanisms.

Use of the biometrically activated device of the present invention is not limited to use in credit cards. For example, a security badge could employ the present invention, allowing only the authorized user the ability to use the security badge. Likewise, drivers licenses or other identification cards using the biometrically activated device would guarantee that only the authorized user could properly operate the biometric device. For example, a drivers license could employ a biometrically activated device. The data on a drivers license, or the picture of the individual owning the drivers license, stored within the memory module could be displayed upon the proper authentication of the user of the license.

The biometrically activated device of the instant invention could additionally be utilized in cell phones. As cell phones become more advanced and more information is stored within the cell phone, it is desirable to provide a means with which to secure the data stored therein. As cell phones and Personal Data Assistants (PDA) are integrated and combined, the need for security will become even more imperative. In order to protect such devices and restrict access to the authorized users of the device, a cell phone or PDA (or combination thereof) could be equipped with the biometrically activated device of the present invention. Thus, the cell phone or PDA could only be activated by the owner or other authorized user of the device.

Additional components connected to the biometrically activated device also expand the uses of the device. For example, instead of releasing data, such as account numbers, the memory module 120 of the device could be programmed to actuate a mechanical device, such as a door lock. The necessary control codes, or required programming in the biometrically activated device allow a user to perform mechanical functions based upon the proper authentication of the user.

It is understood that the present invention is not limited in use, but rather may be employed in any environment where it is necessary or desirous to provide an inexpensive and portable security measure which restricts use of a device to individuals having certain, programmed biometric profiles to access data or information stored within the device or initiate a process.

Embodiments of the present invention can include, but are not limited to, card-based products such as credit cards, smart cards, debit cards, ATM access cards, facilities access cards, security cards, identification cards or other card-based products requiring secure use or activation. Also included, for example, are activation mechanisms for products such as computers, microcomputers, PDA's (personal data assistants), cell phones, secure access systems, secure entry systems, software access mechanisms, PIN number replacement, firearm locks, transaction activation, or voting mechanisms. The present invention can additionally be utilized as a security feature in drivers licenses, passports, theme park passes, safebox access and the like. Further examples include the combination of the present invention with an interactive display screen or computer device to protect computers or information transmitted over the internet. Having thus described certain preferred embodiments of the present invention, it is understood that the invention defined by the appended claims is not to be limited by particular details set forth in the above description, as many apparent variations thereof are possible without departing from the spirit or scope thereof as hereinafter claimed.

In some embodiments, the biometric sensor coupled to a communications device as described above may be used as part of a secure monitoring system. The monitoring system may leverage the biometric sensor disclosed herein to obtain measurements of various biological characteristics of an individual, derive from the measurements one or more biometric markers, and transmit the biometric markers and/or measurements to a monitoring service. The monitoring service may use the information to determine the identity of the individual, authenticate the information, and perform a monitoring function using the information. The monitoring function may determine what, if any, actions should be taken responsive to a particular set of measurements received from an individual. In addition, the monitoring function may provide the user and/or heath care professionals associated with the individual, an indication of the current health state of the individual.

Figure 6A:
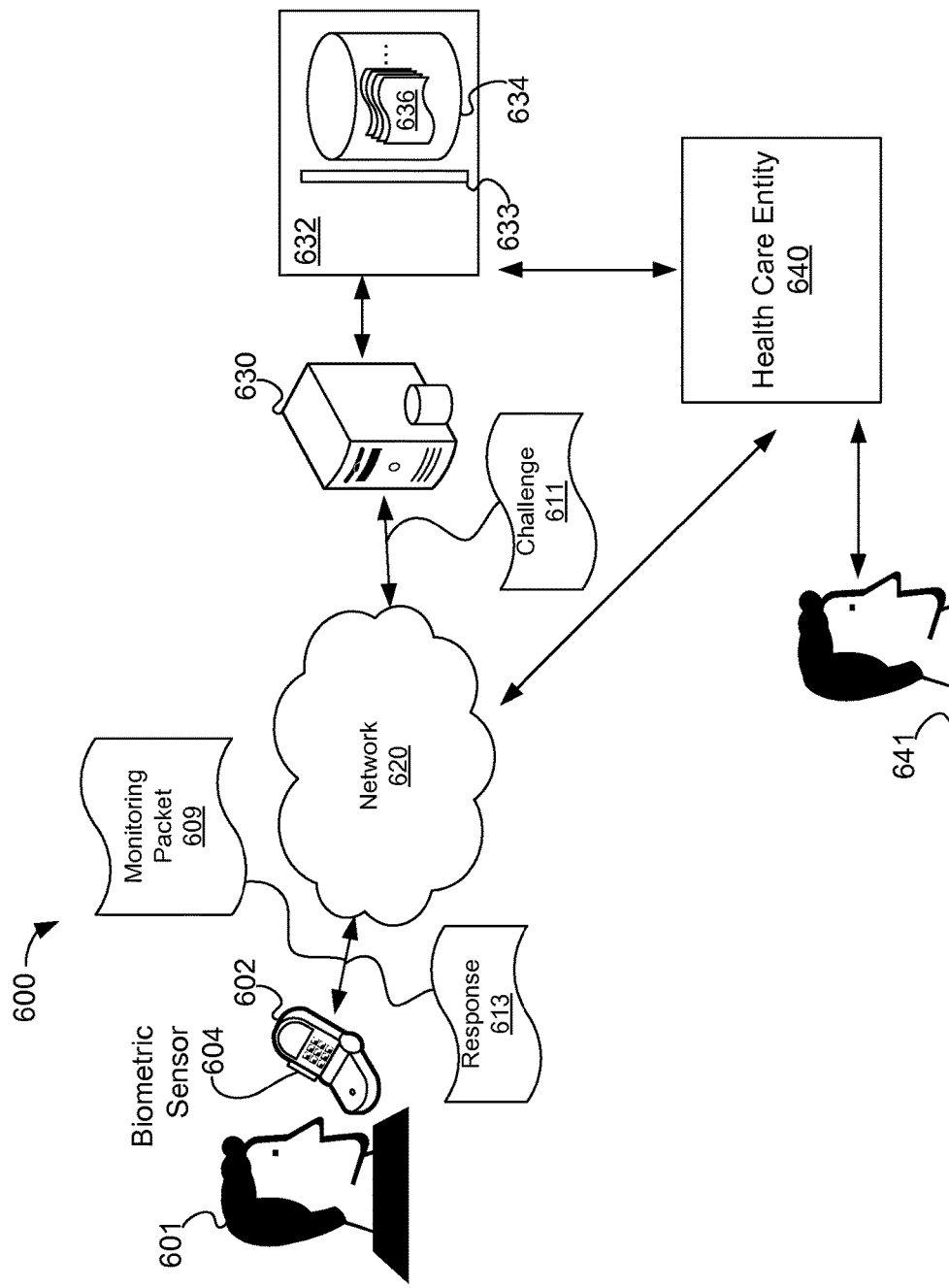
FIG. 6A is a block diagram of a system for securely monitoring an individual.

FIG. 6A is a block diagram of a system for securely monitoring an individual using a biometric sensor coupled to a portable communications device. The portable communications device 602 includes a biometric sensor 604, which may be configured to measure one or more biological characteristics of an individual 601. The biometric sensor 604 may be integrally coupled to the portable communications device 602. Alternatively, the biometric sensor 604 may be detachable (e.g., may be removable and/or separable from the portable communications device). Several examples of portable communications devices comprising respective biometric sensors are described above. The portable communications device 602 may comprise a cellular telephone or smart phone, a personal digital assistant, a portable computer, a media player, or the like.

The biometric sensor 604 may be configured to measure biological characteristics of the individual 601 in various different ways. In some embodiments, the biometric sensor 604 may include an energy emitter and an energy receiver. An example of this type of biometric sensor 604 is described above in conjunction with FIG. 1. The energy emitter may be configured to emit electrical, electro-optical (EO) radiation, or other types of energy radiation into the individual 601. In some embodiments, the emitter may be configured to emit infrared and/or near-infrared light energy into the individual 601. The energy emitter may emit energy configured to penetrate the epidermis of the individual 601 to measure an internal, sub-epidermal characteristic of the individual 601, such as a non-volitional process occurring within the user (e.g., a heartbeat, nervous system response, etc.), a sub-epidermal structure within the user (e.g., a histological characteristic, such as a blood vessel pattern, a skeletal structure, tissue structure, or the like).

The energy emitter may be configured to emit energy of different types (e.g., at various different wavelengths) and/or at various different orientations and/or angles relative to the individual 601. In some embodiments, the biometric sensor 604 may incorporate multiple energy emitters, each configured to emit a respective type of energy at a particular location and/or orientation relative to the individual 601.

The biometric sensor 604 may include one or more energy receivers configured to detect an energy signal responsive to the emitted energy. The receivers may be configured to detect various different types of EO radiation including, EO radiation, electrical energy, or the like.

In some embodiments, the biometric sensor 604 may leverage existing component of the portable communications device 602. For example, the energy receiver may be implemented in conjunction with other features of the device, such as a camera. For example, the portable communications device 602 (which may include a cellular telephone, smart phone, a PDA, or the like) may include a camera or other imaging device. The camera may include an EO capture component, such as a charge-coupled device (CCD) or other EO detector. The biometric sensor 604 may leverage the CCD (or other EO sensor) to detect EO radiation responsive to emission by the EO emitter. The CCD may be adapted to detect EO radiation of the proper wavelength, which may require a modification of the CCD from that of a typical camera. In other embodiments, the CCD may be used to augment another energy sensor (e.g., the camera CCD may be configured to capture EO radiation in the visible spectrum and the biometric sensor 604 may include another sensor configured to capture other types and/or wavelengths of EO radiation). Similarly, the energy emitter of the biometric sensor 604 may leverage components of the portable communications device 602. For example, the portable communications device 602 may include a flash for the camera, illumination LED to illuminate controls of the device 602, or the like. These various emitters may be leveraged to emit EO radiation (or other radiation types) into the individual 601. Similarly, the communications device 602 may include an energy storage device, such as a battery, and may include one or more electrical contacts or conductive surfaces. The energy storage device may be used to power the biometric sensor 604 (e.g., to allow energy to be emitted into and/or received from or through the individual 601). The electrical contacts may be used to emit electrical energy into the individual 601 (e.g., apply a voltage differential to a portion of the individual's body, cause a current to flow though the individual's tissue, or the like).

Alternatively, or in addition to the active sensor described above, the biometric sensor 604 may be and/or comprise a passive sensor. A passive sensor may be configured to measure internal, sub-epidermal characteristics without emitting energy into the individual 601. For example, the biometric sensor 604 may include an electrical contact configured to measure a current and/or voltage differential within the individual 601. Alternatively, the passive sensor may be configured to detect a magnetic field indicative of electrical activity occurring within the individual 601. The electrical signal may be indicative of a heartbeat waveform of the individual 601 (e.g., an electrocardiogram), may be related to the individual's nervous system, may be related to the individual's sensory system, may be a neurological signal, or the like.

Figure 6B:
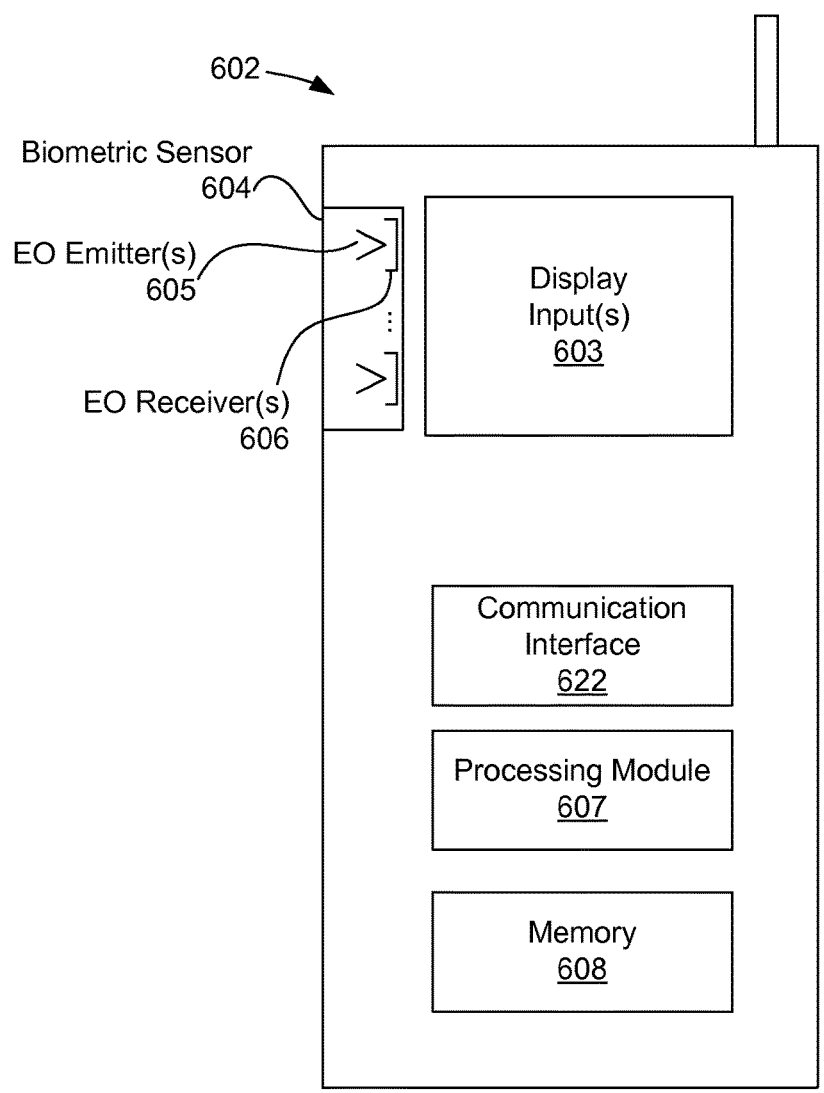
FIG. 6B is a block diagram of a portable communications device comprising a biometric sensor.

As shown in FIG. 6B, the device 602 may include a processing module 607, which may be communicatively coupled to the biometric sensor 604. The processing module 607 may be communicatively coupled to a memory module 608, which may comprise computer-readable instructions. The memory module 608 may include a disk, memory (e.g., flash memory), or any other storage medium known in the art. The processing module 607 and/or the memory module 608 may be shared resources that are used by the portable communications device 602 to provide communications and other services, such as, media services (e.g., music player, video viewer, etc.), provide contact information, store photos, provide various applications (e.g., word processing, email, etc.), and the like. Alternatively, or in addition, the processing module 607 and/or the memory module 608 may be dedicated for the use with the biometric sensor 604.

The biometric sensor 604 may include one or more EO emitters 605 and one or more EO receivers 606, which, as discussed above, may be configured to emit EO radiation into the individual 601 and detect EO signal(s) responsive thereto. In some embodiments, multiple EO emitters 605 and/or EO receivers 606 may be used provide for stereo imaging of the individual 601. Alternatively, or in addition, different EO emitters 605 and/or EO receivers 606 may be used to emit different types of EO radiation into the individual 601 (e.g., EO radiation of different wavelengths, intensities, etc.) and/or from different locations and/or orientations for use with different types of individuals 601. For example, a first individual 601 may hold the device 602 in his or her right hand, whereas a second individual 601 may hold the device 602 in his or her left hand, the EO emitters 605 and/or EO receivers 606 may be distributed on the device 602 to accommodate both types of users. In some embodiments, the biometric sensor 604 may include one or more passive sensors (not shown).

The biometric sensor 604 may be configured to transmit to the processing module 607, signals representative of the energy signals received by the EO receiver(s) 606 (e.g., using active and/or passive sensors). The signals may include analog signals, digital signals, or the like. The processing module 607 may be configured to determine from the signals, measurements of one or more internal, sub-epidermal characteristics of the individual 601. Determining the measurements may include analyzing the signals (e.g., transforming the signals, combining multiple signals, filtering, converting, or the like) to determine the measurements. For instance, the biometric sensor 604 may obtain signals responsive to various different EO wavelengths, each of which may be adapted to react with different portions of tissue and/or fluid within the individual 601. In one example, the wavelengths may be selected to detect oxygenated and deoxygenated blood cells within the individual 601. The processing module 607 may combine signals corresponding to energy received responsive to the different wavelengths to measure a blood flow, oxygen level, or other characteristics of the individual 601. Similarly, the processing module 607 may be configured to combine signals representative of energy signals received responsive to energy emissions obtained at various locations and/or angles relative to the individual 601. The various signals may be combined to create a model (e.g., a 2D or 3D model) of a blood vessel pattern within the individual 601.

The processing module 607 may derive one or more biometric markers from one or more of the measurements as discussed above. One of the biometric markers may be derived from a measurement of an internal, sub-epidermal characteristic of the individual 601, such as a non-volitional process occurring within the individual 601, internal, sub-epidermal structure within the individual 601, or the like. Examples, of various biometric markers related to various measurements are described above.

In some embodiments, the processing module 607 may determine a biometric marker that is substantially unique to the individual 601. The processing module 607 may additionally determine one or more biometric markers that are not as unique to the individual 601 (e.g., do not uniquely identify the individual 601, but may distinguish the individual 601 from some portion of the population). For example, a biometric marker may merely be indicative that the user is a living human (e.g., as opposed to an automatic replay device, a non-human spoofing device, non-living human tissue, or the like), the marker may distinguish the individual 601 from fifty-percent of the population, from eighty-percent of the population, and so on. One or more of the biometric markers may be used to verify that a unique biometric marker was obtained from a living human and/or may be used with (e.g., layered with) other biometric markers.

After determining the one or more biometric markers, the processing module 607 may be configured to activate the portable communications device 602. Activating the portable communications device 602 may include activating a communications interface 622, which may be communicatively coupled to the processing module 607 and/or biometric sensor 604. Upon activation, the device 602 may be configured to perform a communications function using the communications interface 622, such as transmitting and/or receiving data on a network, such as communications network 620 of FIG. 6A. The communications network 620 of FIG. 6A may comprise any communication network (or combination of networks) known in the art including, but not limited to: a public switched telephone network (PSTN), a data communications network, a TCP/IP network, the Internet, a wireless network, a cellular network, or the like.

Referring to FIG. 6A, the portable communications device 602 may be configured to transmit data to a receiver 630. The data may include the measurements and/or the biometric markers derived therefrom. As used herein, information transmitted from the portable communications device 602 to the receiver may be referred to as a "monitoring packet" 609. A monitoring packet 609 may include, but is not limited to: one or more measurements obtained using the biometric sensor 604, one or more biometric markers derived from the measurements, user-identifying information, and the like. The monitoring packet 609 transmitted by the portable communications device 602 may include information relating to and/or obtained from the individual 601.

In some embodiments, the monitoring packet 609 may include information, which may be used to identify the individual 601 and/or reduce the search space for the individual 601 by the receiver 630 and/or monitoring service 632. For example, in a PSTN or cellular network 620, the transmission may include the number (or other addressing information) of the portable communications device 602. Transmission over a data network, such as TCP/IP may include the IP address, media access layer (MAC) address, hardware address, or the like. Other communications networks 620 may include similar information.

The information transmitted over the network 620 may be protected by a transport layer security mechanism, such as encryption (e.g., using secure sockets layer (SSL) or another standard), authentication (e.g., mutually authenticated SSL), or the like. The transport layer security may prevent the information transmitted by the device 602 from being acquired by an unauthorized receiver (e.g., in a man-in-the middle attack).

The receiver 630 may receive the monitoring packet 609 transmitted by the portable communications device 602. The receiver 630 may include and/or be communicatively coupled to a monitoring service 632, which may be configured to monitor one or more individuals, such as the individual 601. The receiver 630 and/or the monitoring service 632 may comprise one or more computing devices (server computers) comprised of one or more processors, memory units, processing units, input/output devices, displays, communications interfaces, and the like.

The receiver 630 may include and/or be communicatively coupled to a data store 634, comprising information on various individuals. As used herein, information about an individual that is maintained by the receiver 630 and/or the monitoring service 632 on the data store 634 may be referred to as an individual profile 636. Accordingly, an individual profile 636 may refer to a data structure comprising information about an individual 601. The data structure embodying an individual profile 636 may be stored on the data store 634, which may include a computer-readable storage medium. As will be discussed below, an individual profile 636 may include, but is not limited to: a biometric profile of the individual 601, the biometric profile comprising one or more biometric markers and/or measurements of internal, sub-epidermal characteristics of the individual 601, measurements received from an individual 601 over a particular time period, monitoring instructions for the individual 601 (e.g., rules, triggers, thresholds, and the like), identifying information, and the like.

Access to the information (the individual profiles 636) in the data store 634 may be protected under various guidelines, such as Health Insurance Portability and Accountability Act (HIPPA), the Personal Health Information Privacy Act (PHIA), or the like. Therefore, the monitoring service 632 and/or the data store 634 may include a security layer 633 (discussed below), which may be configured to enforce access control or other security measures to protect the individual profiles 636. The data store 634 may be implemented using any data storage and/or data management technique known in the art including, but not limited to: a relational database, an XML database, a directory, a file system, or the like. Accordingly, the data store 634 may include one or more fixed disks, non-volatile memory (Flash memory), volatile memory, optical storage, tape storage, and the like.

As discussed above, an individual profile 636 may include information relating to monitoring of an individual 601, and, as such may include baseline biological measurements of various characteristics of the individual 601, including, but not limited to: a baseline heartbeat waveform, hemodynamic waveform, blood pressure, pulse rate, blood oxygen level, glucose level, tissue features, and the like. These baseline measurements may comprise a biometric profile of the individual 601, which may be used to monitor the individual 601.

The individual profile 636 may further include one or more scripts, rules, and/or triggers (discussed below), which may be used to perform a monitoring function on the user. The monitoring function may be performed to determine an appropriate action (if any) to take in response to a monitoring packet 609 received from the individual 601.

Monitoring packets 609 received by the receiver 630 may be validated (e.g., using transport layer security mechanisms, such as SSL, mutually authenticated SSL, or the like), and forwarded to the monitoring service 632. The forwarding may comprise scanning the monitoring packets for viruses, Trojans, or other malicious information or code. The monitoring service 632 may be protected using various network security features. For example, the receiver 630 may be placed within a network DMZ and may be separated from the monitoring service 632 by a firewall (not shown) or other network security device.

Upon receiving the monitoring packet 609, the monitoring service 632 may be configured to identify the individual 601 associated with the packet 609, authenticate the identity of the individual 601 and/or the information within the packet 609, and perform a monitoring function using information within the monitoring packet 609.

The receiver 630 may identify the information using a biometric marker included with and/or embedded within the monitoring packet 609. As discussed above, a biometric marker determined by the biometric sensor 604 may be substantially unique to the individual 601. Therefore, the biometric marker may be used to identify the individual 601. Identifying may include comparing the biometric marker in the monitoring packet 609 to information stored in the data store 634. For example, the biometric marker may be compared to each individual profile 636 within the data store 634. The identity to the individual 601 associated with the monitoring packet 609 may be determined by matching an individual profile 636 to the biometric marker therein (e.g., if the biometric marker corresponds to the individual profile 636, the identity of the sender of the monitoring packet 609 may be determined.)

In some embodiments, the process of identifying the sender of the monitoring packet 609 may be hierarchical; for example, the packet 609 may include plural biometric markers. One or more of the markers may not be completely unique to the individual 601 (e.g., may exclude fifty percent of the population). The non-substantially unique biometric markers may provide for relatively fast comparisons (e.g., fast comparisons between the individual profiles 636 and the biometric marker, as opposed to comparisons involving the substantially unique biometric marker(s)). Accordingly, the non-unique biometric marker(s) may be used first to exclude one or more of the individual profiles 636 on the data store 634. The unique biometric marker may then be applied to the remaining profiles 636 until a match is found.

In some embodiments, the search space for a matching individual profile 636 may be reduced using user-identifying information within the monitoring packet 609. As discussed above, the monitoring packet 609 may include user-identifying information. The information may have been provided by the user (e.g., a user name, email address, PIN, or the like), and/or may have been included by the transport-layer (e.g., a hardware address, and IP address, a MAC address, or the like). The monitoring service 632 may use the user-identifying information to reduce the search space within the data store 634. For example, addressing information (such as an IP address, MAC, or the like) may be used to reduce the search space to those individuals that are known to have a corresponding device and/or address. A relationship or association between an individual profile 636 and a device or address may be established a priori (e.g., when the individual 601 establishes his/her profile 636) and/or may be done on an ad hoc basis (e.g., each time an individual 601 submits a monitoring packet 609 using a new device and/or address, the address may be associated with the individual profile 636 of the individual 601).

If the individual profile 636 identified using the user-identification information does not correspond to the monitoring packet 609, the rest of the individual profiles 636 may be searched as described above. For example, if a first user borrows a device owned by a second user to transmit a monitoring packet 609, the user identifying information included with the packet 609 (e.g., IP address, MAC address, etc.) may be associated with the second user (since the device 602 is typically used by the second user). However, the biometric marker in the monitoring packet 609 will not correspond to the individual profile 636 of the second user. Upon determining that the user-identifying information did not provide a match, the monitoring service 632 and/or security layer 633 may search the rest of the individual profiles 636 (or a subset thereof) to identify the individual profile 636 of the first user.

After the individual 601 (and individual profile 636) corresponding to the monitoring packet 609 has been identified, the monitoring service 632 and/or security layer 633 may be configured to authenticate the information within the monitoring packet 609. In some embodiments, the packet 609 may be authenticated in part by the transport layer used to transmit the packet 609 (e.g., by the SSL or mutually authenticated SSL connection). In addition, the monitoring packet 609 may include one or more biometric markers. The biometric markers may be compared to information in the identified individual profile 636. In some embodiments, the individual profile 636 may include one or more biometric markers corresponding to the biometric markers transmitted in the packet 609. The markers may be compared and, if the markers correspond to one another (e.g., match within a particular tolerance or threshold), the markers may be identified as being produced by the individual 601 (e.g., may be authenticated). Similarly, the individual profile and/or packet 609 may include one or more baseline measurements and/or a biometric profile from which a biometric marker may be derived. The derived biometric markers may be compared for a match.

In some embodiments, the authentication may include a challenge/response interaction. Responsive to identifying the individual profile 636 associated with the monitoring packet 609, the monitoring service 632 and/or security layer 633 may transmit a challenge message 611 to the portable communications device 602. The challenge 611 may require that the individual 601 provide a particular authentication credential (e.g., a digital signature), a password, or the like.

Alternatively, or in addition, the challenge 611 may request a particular biometric marker or biological measurement. For example, the challenge 611 may request a hemodynamic waveform of the user, a blood vessel pattern of the user, or the like. The monitoring service 632 and/or security layer 633 may select the biometric marker or measurement for the challenge 611 from a set of measurements that the biometric sensor 604 is capable of acquiring. The selection may be random or may follow a predetermined pattern. The selection of the particular biometric marker and/or measurement may prevent a replay or similar attack. In response to the challenge 611, the processing module (607 in FIG. 6B) may be configured to obtain the requested biometric marker and/or measurement using the biometric sensor 604. As shown in FIG. 6A, a response 613 to the challenge may then be transmitted to the receiver 630 via the network 620. The monitoring service 632 and/or security layer 633 may validate the response 613 to the challenge 611 and, if the response 613 is validated, may authenticate the individual 601.

The challenge/response procedure described above may not be required in every case. Accordingly, in some embodiments, the monitoring service 632 and/or security layer 633 may authenticate the monitoring packet 609 and/or the identity of the individual 601 on the basis of the biometric marker(s) within the monitoring packet 609. In some embodiments, the monitoring service 632 and/or security layer 633 may determine whether to perform a challenge/response procedure according to the contents of the monitoring packet 609. For example, if the monitoring packet 609 includes a "weak" biometric marker (not particular unique to the individual 601), a challenge/response may be issued. Similarly, if the monitoring packet 609 is received from a device, location, and/or address that has not been used by the individual 601 in the past (e.g., the individual 601 is using a new communications device 602 for the monitoring), a challenge/response procedure may be followed. However, if several strong biometric markers and/or measurements are provided in the monitoring packet 609, no challenge 611 may be issued.

After authenticating the monitoring packet 609, the monitoring service 632 may perform a monitoring function. The monitoring function may be defined in one or more scripts, rules, and/or triggers. A monitoring script may compare the one or more measurements within the monitoring packet 609 to one or more baseline measurements of the individual 601, to one or more thresholds, or the like. The results of the comparisons may be evaluated by one or more rules and/or triggers.

A rule may specify a particular action in response to a particular measurement and/or deviation between a measurement and an established baseline of the individual 601. For example, if a hemodynamic waveform measurement in the packet 609 exceeds a particular threshold (e.g., a systolic and/or diastolic pressure threshold) a first action may be triggered by the monitoring service 632. If a heartbeat waveform measurement in the monitoring packet 609 shows a divergence from a baseline measurement (e.g., exhibits an abnormal rhythm or the like) a second action may be triggered. In another example, if the blood oxygen level of the individual 601 shows a divergence from the established baseline of the individual 601, a third action may be triggered, and so on.

The triggers associated with the individual profile 636 may determine the nature of the actions taken by the monitoring service 636 in response to the rules discussed above. The triggers may define various different thresholds, each of which may result in a different action taken by the monitoring service 632. For example, if the divergence between the hemodynamic waveform exceeds a threshold by a small mount, the trigger may determine a first action, if the threshold is exceeded by a larger amount a second action may be taken, and so on. For instance, a small divergence in a blood pressure measurement may trigger an alert to the individual 601 to take a particular action (e.g., reduce activity level, control stress, etc.). The alert may be transmitted from the monitoring service to the individual 601 via the portable communications device 602 or some other device or address (e.g., email address, SMS message, voice message, or the like). The alert may include an audible alarm, vibration, or other alerting mechanism provided by the mobile communications device 602 (e.g., a ringtone or the like). Alternatively, or in addition, heath care providers responsible for the care and/or monitoring of the individual 601 may be notified (e.g., a doctor or other health care provider 641), a health care entity 640 (discussed below), or the like). If a more significant divergence is observed, a different response from the monitoring service 632 may be triggered. For example, the individual 601 may be alerted to seek medical attention immediately (e.g., via the portable communications device 602 or the like), medical response personnel may be dispatched to the individual 601 (e.g., in an ambulance response or less urgent method if appropriate).

The triggers discussed herein may be adapted to provide any number of different responses to any number of different conditions. For example, a rule and/or trigger may include multiple measurements, such as a combination of pulse rate and pressure. A rule or trigger may be activated responsive to changes in both measurements (e.g., a divergence in both measurements may indicate a more serious condition than a change in a single measurement). In addition, a combination of changes may be capable of detecting more subtle changes within the measurements. For instance, a serious condition may be detected by small changes in a plurality of measurements as opposed to waiting for a more significant change in a single measurement.

In some embodiments, a rule and/or trigger may specify a change to the monitoring of the individual 601. For example, a trigger may indicate that a different set of measurements are required for proper monitoring (e.g., may require a hemodynamic waveform). Accordingly, a trigger may transmit a reconfiguration message to the portable communications device 602 to configure the device to include the additional measurement(s) in subsequent monitoring packets 609. Similarly, a trigger may indicate that one or more measurements are redundant or unnecessary and a corresponding reconfiguration message may be transmitted.

In some embodiments, an individual 601 may provide monitoring packets 609 at a particular interval. The individual 601 may be reminded to provide the measurements by the portable communications device 602 (e.g., via a prompt issued by the device via a ring, message, or the like). Alternatively, or in addition, the prompt may be provided by the monitoring service 632 by way of a reminder message. A trigger or rule associated with the individual profile 636 may modify the frequency of the monitoring according to the measurements provided by the individual 601. For instance, if a trigger or rule indicates a slight divergence from a particular baseline or threshold, the monitoring frequency may be increased. Alternatively, if the user has provided steady measurements for a particular time period, the monitoring frequency may be decreased, and so on.

In some embodiments, the monitoring service 632 may determine that an additional measurement is required right away. For example, a first measurement may be indicative of a particular condition or health state. The monitoring service 632 may determine (according to a particular trigger or rule) that in order to verify the condition or heath state, one or more additional measurements are required. Accordingly, the monitoring service 632 may issue a request to the portable communications device 602 to cause the device to prompt the individual 601 to provide the requested measurement.

Although the monitoring service 632 is described as using a particular monitoring function comprising scripts, rules, and/or triggers, the monitoring service 632 described herein is not limited in this regard. The monitoring service 632 could be adapted to use any monitoring technique and/or methodology known in the art.

The monitoring service 632 may be communicatively coupled to a health care entity 640. The entity 640 may represent a doctor, group of doctors, a health maintenance organization, healthcare cooperative, a hospital, a clinic, or the like. The monitoring service 632 may provide the health care entity 640 with information regarding individuals in the care of the health care entity 640. Accordingly, personnel and/or automated systems within the entity 640 may have access to one or more portions of one or more individual profiles 636 available on the data store 634 (e.g., measurements obtained from the individual 601 via the device 602). The information may include, but is not limited to: a health state of the individual 601 (as determined by the monitoring service 632), the scripts, rules, and/or triggers of the individual 601, historical measurement readings, or the like. Access to the information in the individual profile 636 may be controlled by the security layer 633 to conform to one or more sets of regulations (e.g., HIPPA or the like).

In some embodiments, the health care entity 640 and/or authorized personnel of the entity, such as a health care provider 641, may be allowed to modify the individual profile 636 of the individual 601. The modifications may include changing the nature of the monitoring performed by the monitoring service 632, changing the types of measurements requested from the individual 601, and the like. For instance, the health care entity 640 (or health care provider 641) may define the types of measurements to be obtained from the individual 601, the frequency at which the monitoring should be performed, and the like. In addition, the health care entity 640 may modify the script, rules, and/or triggers associated with the individual 601. For example, the health care entity 640 may define conditions, which may cause the monitoring service 632 to contact or alert the entity 640 (e.g., define the thresholds, etc. evaluated by the monitoring service 632). In other embodiments, the monitoring service 632 itself (or personnel of the monitoring service 632 may perform these functions).

The individual 601 may have access to portions of his/her individual profile 636. The access may be provided via the network 620. For example, the monitoring service 632 and/or the receiver 630 may include and/or be communicatively coupled to a web server or other server computing device (e.g., the receiver 630 may include a web server and/or be communicatively coupled to a separate web server computing device (not shown)). The individual 601 may access the web server using a communications device (e.g., personal computer, cellular phone, PDA, or the like). The individual 601 may authenticate his/her identity to the web server (e.g., using a biometric marker as described above or using other means for authentication, such as a password, certificate, credential, or the like). After authenticating the identity of the individual 601, the web server may provide an interface configured to display portions of the individual profile 636. In some embodiments, the individual 601 may access the measurements obtained via the portable communications device 602, access any alerts and/or triggers that have been detected by the monitoring service 632, and so on. Alternatively, or in addition, information derived from the measurements, such as health state, calories burned, or the like, may be displayed.

In some embodiments, the individual 601 may be allowed to modify his/her individual profile 636 through the interface. For instance, the individual 601 may change frequency he/she is reminded to provide monitoring information, change the types of measurements obtained by the biometric sensor 604, and so on.

Figure 7:
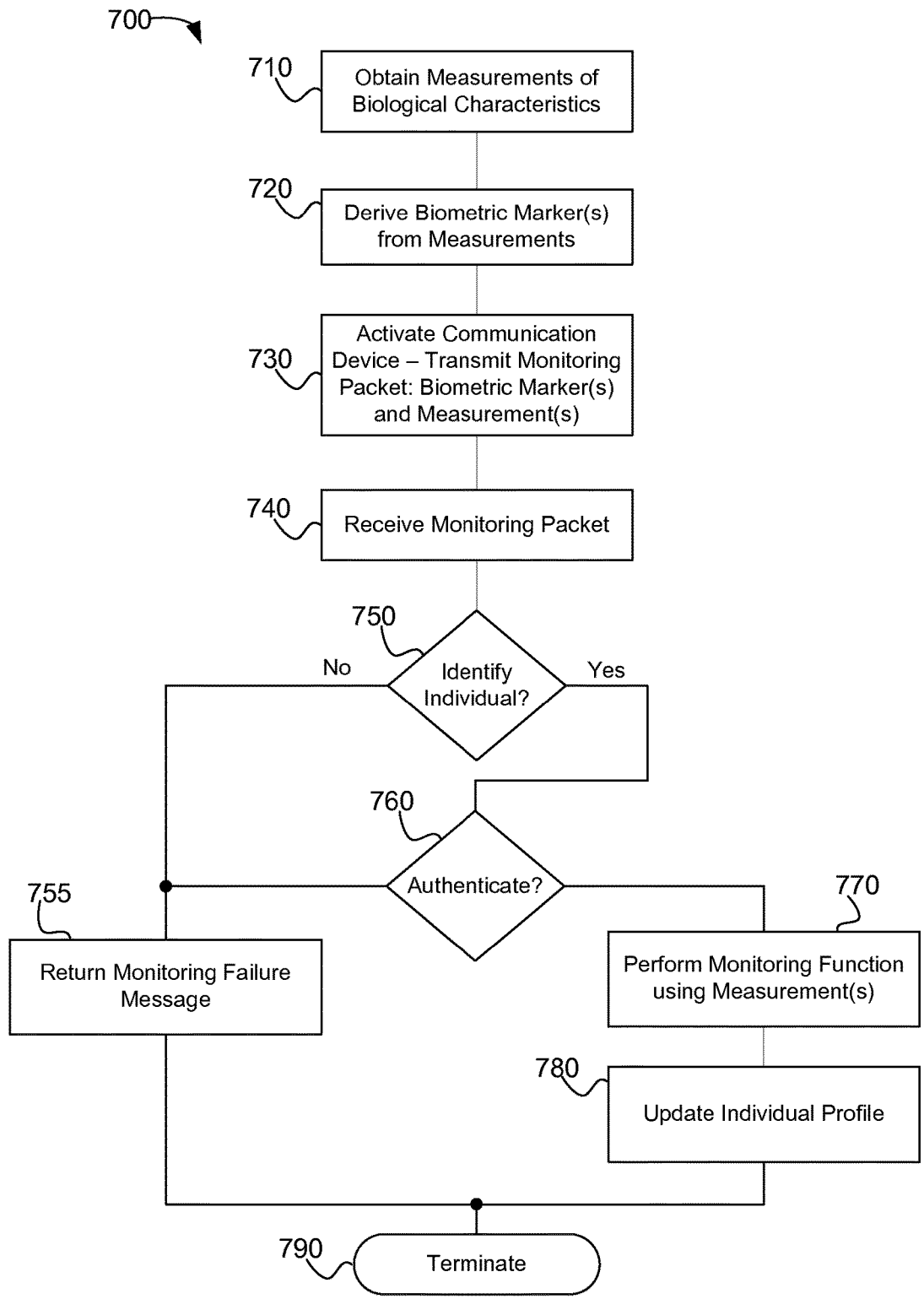
FIG. 7 is a flow diagram of a method for securely monitoring an individual.

FIG. 7 is a flow diagram of one embodiment of a method for securely monitoring an individual using a portable communications device comprising a biometric sensor. The method 700 may comprise one or more machine executable instructions stored on a computer-readable storage medium. The instructions may be configured to cause a machine, such as a computing device, to perform the method 700. In some embodiments, the instructions may be embodied as one or more distinct software modules on the storage medium. One or more of the instructions and/or steps of method 700 may interact with one or more hardware components, such as computer-readable storage media, communications interfaces, or the like. Accordingly, one or more of the steps of method 700 may be tied to particular machine components.

At step 710, a biometric sensor coupled to a communication device may obtain one or more biological measurements of an individual. One or more of the measurements may correspond to internal, sub-epidermal characteristics of the individual, such as non-volitional processes occurring within the individual, sub-epidermal structure within the individual, or the like.

The biometric sensor may be configured to obtain measurements from the individual each time the individual utilizes the communication device. The measurements may be acquired non-invasively while the individual uses the communications device (e.g., makes a call, browses the Internet, authors an email or text message, and so on). The measurements may be obtained at a particular interval (e.g., every four hours). Accordingly, each time the user access the device, the interval may be evaluated and, if the interval has expired, the measurements may be obtained. In some embodiments, an alert may be issued after the internal has expired to prompt the user (e.g., via an audible tone, message, email, or the like) to utilize the communications device to provide the measurements.

As described above, the measurements obtained at step 710 may be acquired using an active sensor and/or a passive sensor. The sensors may be coupled to the communications device, such that as the individual uses the communications device, the sensors may be capable of obtaining the measurements from the user. In some embodiments, the communications device may be adapted to prompt the user to hold the communications device in a certain way to allow the sensors to obtain the measurements. For example, a cellular telephone may include an electrode on the surface of the phone and the individual may be prompted to place the electrode on contact with his/her forehead as the individual uses the device. Similarly, the cellular phone may include an emitter (e.g., as shown in FIG. 1), which may be adapted to receive the finger or other appendage of the individual.

At step 720, one or more biometric markers may be derived from the measurements as described above. One or more of the biometric markers derived at step 720 may be substantially unique to the individual, whereas other biometric markers may be less unique and/or may be indicative of biological activity of the individual (e.g., indicate that another biometric marker was obtained from a live human).

At step 730, one or more of the biometric markers derived at step 720 and/or one or more the measurements obtained at step 710 may be transmitted to a receiver using the communications device. As discussed above, the transmission may be made over any communications network known in the art (e.g., PSTN, TCP/IP, Internet, wireless network, or the like). As described above, the information transmitted at step 730 (the biometric marker(s) and measurement(s)) may be referred to as a "monitoring packet."

The transmission of step 730 may make use of various transport layer security techniques, such as encryption, authentication, and the like (e.g., SSL, mutually authenticated SSL, etc.). The transport level security may prevent the monitoring packet from being acquired by an unauthorized receiver (e.g., in a man-in-the middle attack).

In some embodiments, the monitoring packet may include information that may be used to identify the individual and/or reduce the search space required to identify the individual (in addition to the biometric marker(s) and measurement(s)). As described above, the information may be provided by the individual himself, may be provided by the transport layer, and/or may be embedded within the communications device used to transmit the monitoring packet. The user-identifying information may include, but is not limited to: a user name, a PIN, an email address, a hardware address, a MAC address, an IP address, and so on. The user-identifying information may be provided by the individual and/or may be automatically included in the monitoring packet without user intervention.

At step 740, a monitoring system may receive the monitoring packet transmitted at step 730.

At step 750, the monitoring service may identify an individual associated with the monitoring packet. The identification may be based upon the biometric marker(s) and/or measurement(s) in the monitoring packet. In addition, and as described above, additional user-identifying information may be used to identify the individual and/or reduce the search space for the individual.

As described above, identifying the individual may comprise associating the monitoring packet with an individual profile, an individual account, or other data structure associated with the individual ("individual profile" hereafter). The individual profile may include various monitoring information about the user including, but not limited to: one or more pre-established biometric markers of the individual, baseline measurements of the individual, monitoring scripts, rules, and/or triggers, and so on. The identification of step 750 may result in identifying a particular individual profile associated with the monitoring packet. Therefore, at step 755, the method 700 may determine whether a single individual has been identified and, if so, the flow may continue to step 760; otherwise, if an individual is not identified, the flow may continue to 755.

At step 755, a return message may be transmitted to the communications device that transmitted the monitoring packet. The message may indicate that no individual profile having the provided biometric marker, measurements, and/or user-identifying information could be found. The message may allow the individual to establish a new individual profile with the monitoring service. The message may provide relevant links and/or contact information to allow the individual to contact the monitoring service and/or a health care entity (discussed below) for further assistance. The flow may then continue to step 790.

At step 760, the monitoring service may authenticate the monitoring packet. Authenticating the monitoring packet may include verifying that the packet was sent by and/or authorized by the individual identified at step 755. The authentication of step 760 may include comparing the biometric marker(s) within the monitoring packet to one or more biometric marker(s) and/or measurements within the individual profile identified at step 755. If the biometric marker(s) correspond to the identified individual profile, the monitoring packet may be authenticated.

In some embodiments, the authentication of step 760 may include a challenge/response. Accordingly, at step 760, the monitoring service may issue a challenge to the sender of the monitoring packet (e.g., to the device from which the monitoring packet was received). The challenge may request that the individual provide a particular measurement or biometric. The monitoring service may receive a response to the challenge, which, if validated, may authenticate the monitoring packet.

If the monitoring packet is authenticated, the flow may continue to step 770; otherwise, the flow may continue to step 755.

At step 770, a monitoring function may be performed. The monitoring function may be provided by the method 700 or another entity, such as a heath care provider entity, or the like. The monitoring function of step 770 may comprise performing a script associated with the individual profile as discussed above. The script may compare one or more measurements within the monitoring packet to one or more rules, triggers, and the like. Responsive to the comparisons, one or more actions may be taken including, but not limited to: transmitting an alert to the individual (e.g., via the communication device or by another mechanism); alerting a health care provider entity; dispatching a medical response to the individual; updating a record (e.g., individual profile) of the individual; transmitting information to the individual (e.g., including a summary of the health state of the individual as indicated by the measurements within the monitoring packet); or the like.

At step 780, an individual profile of the individual may be updated. The updating may include storing the measurement(s) and/or biometric marker(s) received in the monitoring packet in a computer-readable storage medium (e.g., in an individual profile). The measurement(s) may be used to update one or more baseline measurements of the individual. Similarly, the biometric marker(s) may be used to update and/or modify the biometric markers in the profile. In this way, the individual profile may reflect gradual changes to the measurements obtained from the individual. The original measurement(s) and/or biometric marker(s) may be retained in the profile and/or used for monitoring and/or diagnostic purposes (e.g., to identify trends which may be indicative of a particular health state or condition). The flow may then continue to step 790.

At step 790 the method 700 may terminate until another set of measurements is acquired and/or received (at steps 710 and/or 740).

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a computer-readable medium having stored thereon instructions that may be used to program a computer (or other electronic device) to perform processes described herein. The computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, module, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A method comprising:
   transmitting, using an energy emitter of a biometric sensor, a first energy signal into a sub-epidermal structure of an individual,
   receiving, from the sub-epidermal structure of the individual, a second energy signal using an energy sensor of the biometric sensor;
   determining a first sub-epidermal characteristic of the individual using the second energy signal;
   transmitting, to a monitoring service executing on a server device, the first sub-epidermal characteristic of the individual;
   receiving, from the monitoring service executing on the server device, a request for a second sub-epidermal characteristic of the individual;
   measuring, using the biometric sensor, the second sub-epidermal characteristic of the individual;
   transmitting, to the monitoring service executing on the server device, the second sub-epidermal characteristic; and
   receiving, at a portable electronic device, a first alert from the monitoring service executing on the server device when the second sub-epidermal characteristic diverges from one or more thresholds defined in a profile for the individual, the profile comprising one more profile measurements corresponding to sub-epidermal measurements previously taken for the individual.

2. The method of claim 1, further comprising:
   deriving a biometric marker from the first sub-epidermal characteristic; and
   transmitting, to the monitoring service executing on the server device, the biometric marker.

3. The method of claim 2, wherein the biometric marker, the first sub-epidermal characteristic, and the second sub-epidermal characteristic are encrypted for transmission over a network.

4. The method of claim 2, further comprising receiving, from the monitoring service executing on the server device, instructions responsive to the monitoring service executing on the server device monitoring the second sub-epidermal characteristic.

5. The method of claim 4, further comprising receiving, from the monitoring service executing on the server device, second alert in responsive to the monitoring service executing on the server device monitoring the second sub-epidermal characteristic.

6. The method of claim 5, further comprising emitting the second alert an audio alert in response to receiving the alert from the monitoring service executing on the server device.

7. The method of claim 5, further comprising activating a vibrator in response to receiving the second alert from the monitoring service executing on the server device.

8. The method of claim 2, further comprising:
   identifying using the biometric marker, information associated with the individual; and
   monitoring the individual using the biometric marker.

9. The method of claim 8, wherein the information associated with the individual comprises an individual profile stored on a computer-readable storage medium, the individual profile comprising one more individual profile measurements corresponding to sub-epidermal structure measurements previously taken for the individual.

10. The method of claim 9, further comprising authenticating, using the biometric marker, the second sub-epidermal characteristic.

11. The method of claim 10, wherein:
    the information associated with the individual comprises a stored biometric marker, and
    authenticating the second sub-epidermal characteristic comprises comparing the biometric marker to the stored biometric marker.

12. The method of claim 10, wherein:
    the information describing the individual comprises a biometric profile of the individual, and
    authenticating the second sub-epidermal characteristic further comprises comparing the biometric marker to the biometric profile.

13. The method of claim 9, further comprising recording the second sub-epidermal characteristic into the individual profile.

14. The method of claim 9, further comprising:
comparing the second sub-epidermal characteristic to one or more thresholds defined in the individual profile; and
transmitting, to a device associated with a health care provider, a third alert when the second sub-epidermal characteristic diverges from the one or more thresholds.

15. The method of claim 1, further comprising:
transmitting, using the energy emitter, a third energy signal into a second sub-epidermal structure of the individual,
receiving, using the energy sensor, from the second sub-epidermal structure of the individual, a fourth energy signal; and
determining, using the fourth energy signal, the second sub-epidermal characteristic of the individual.

16. The method of claim 1, wherein the biometric sensor is integrated into a cellular telephone, a personal digital assistant, a laptop computer, or a media player.

17. The method of claim 1, wherein the first sub-epidermal characteristic or the second sub-epidermal characteristic corresponds to a non-volitional process occurring within the individual.

18. The method of claim 17, wherein the first sub-epidermal characteristic or the second sub-epidermal characteristic is a hemodynamic waveform.

19. The method of claim 17, wherein the first sub-epidermal characteristic or the second sub-epidermal characteristic is a histological structure within the individual.

20. The method of claim 1, wherein the first sub-epidermal characteristic or the second sub-epidermal characteristic is a heartbeat waveform.

21. A system comprising:
a portable device comprising:
an biometric sensor, the biometric sensor comprising:
an energy emitter to transmit, into a sub-epidermal structure of an individual, a first energy signal towards the individual;
an energy receiver to detect, from the sub-epidermal structure of the individual, a second energy signal, and
a processing device, coupled to the biometric sensor, the processing device is to:
determine a first sub-epidermal characteristic of the individual using the second energy signal;
determine a biometric marker of the individual using the first sub-epidermal characteristic;
transmit, to a monitoring service executing on a server device, the biometric marker;
receive, from the monitoring service executing on the server device, a request for a biometric characteristic;
transmit, to the monitoring service executing on the server device, the biometric characteristic of the individual;
receive, from the monitoring service executing on the server device, a challenge message requesting a measurement of a second sub-epidermal characteristic of the individual;
measure, using the biometric sensor, the sub-epidermal structure of the individual to obtain the second sub-epidermal characteristic of the individual;
transmit, to the monitoring service executing on the server device, the second sub-epidermal characteristic for the monitoring service executing on the server device to compare the second sub-epidermal characteristic to a biometric profile of the individual; and
receiving, at a portable electronic device, a first alert from the monitoring service executing on the server device when the second sub-epidermal characteristic diverges from a threshold defined in a profile for the individual, the profile comprising one more profile measurements corresponding to sub-epidermal measurements previously taken for the individual.

22. The system of claim 21, further comprising a communications device to transmit, to the monitoring service executing on the server device, a monitoring packet in responsive to the processing device deriving the biometric marker.

23. The system of claim 22, wherein the monitoring packet comprises the biometric marker and the first sub-epidermal characteristic of the individual.

24. The system of claim 23, wherein:
the communication device is to send the monitoring packet to a monitoring service, and
the system further comprising:
the monitoring service to receive the monitoring packet from the communications device, the monitoring service comprising:
a computer-readable storage medium to store one or more information profiles corresponding to the individual; and
a security layer to associate the monitoring packet with an individual profile using the monitoring packet,
wherein the monitoring service is to perform a monitoring function for the individual using the individual profile associated with the monitoring packet and the biometric marker and the first sub-epidermal characteristic of the individual of the monitoring packet.

25. The system of claim 24, wherein the security layer is to authenticate the monitoring packet using the one or more biometric markers in the monitoring packet.

26. The system of claim 25, wherein the authenticating the monitoring packet comprises comparing the one or more biometric markers in the monitoring packet to the biometric profile in the individual profile.

27. The system of claim 24, wherein the monitoring service is further to compare a selected measurement received in the monitoring packet to the threshold defined in the individual profile associated with the monitoring packet.

28. The system of claim 27, wherein the portable device is to receive, from the monitoring function, an alert when the selected measurement diverges from the threshold.

29. The system of claim 27, wherein the monitoring function is further to transmit an alert to a health care entity when the selected measurement diverges from the threshold.

* * * * *